UNITED STATES PATENT OFFICE.

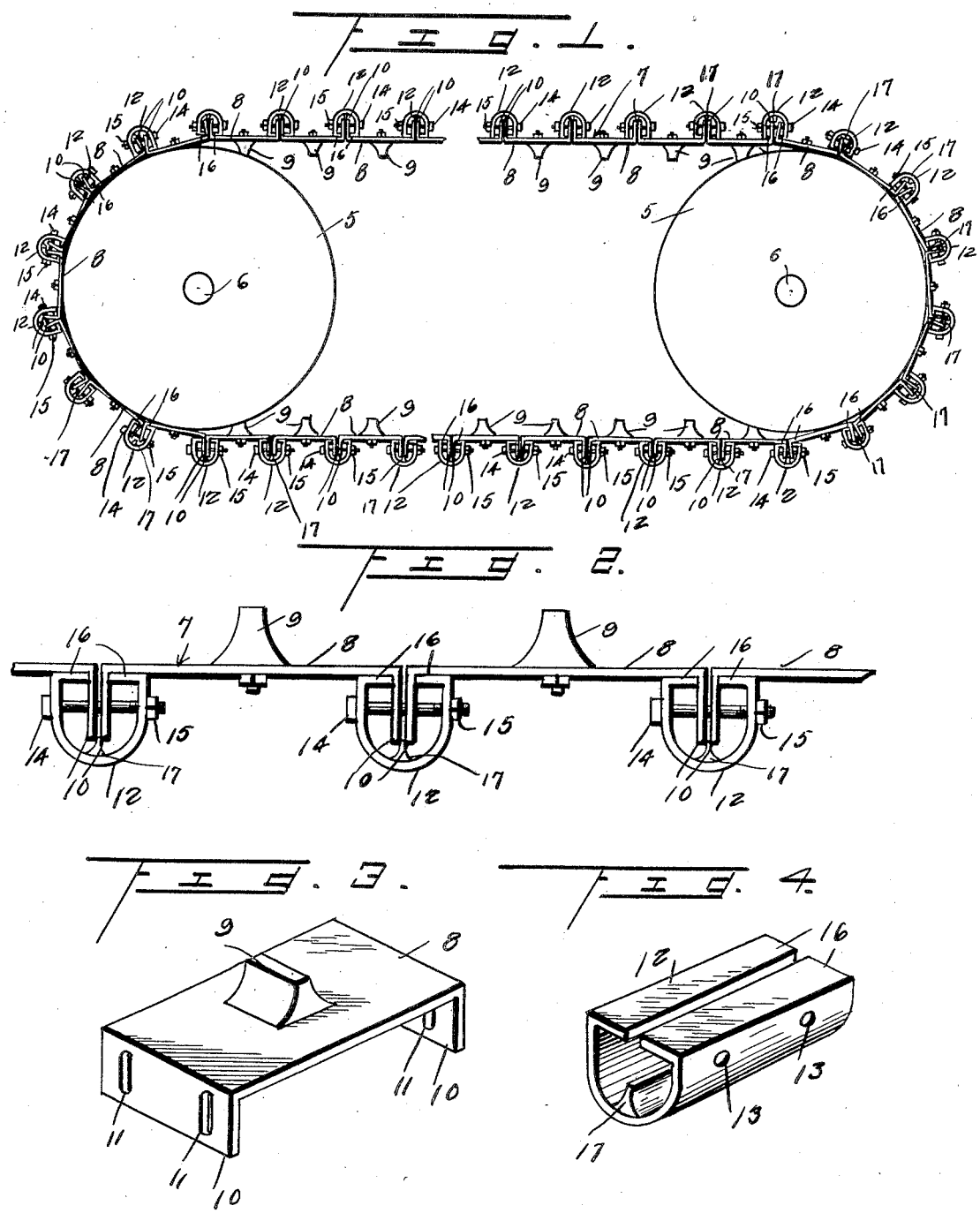

SALVATORE FASO, OF MADERA, CALIFORNIA.

TRACK FOR TRACTORS.

1,326,331.   Specification of Letters Patent.   Patented Dec. 30, 1919.

Application filed February 26, 1919. Serial No. 279,298.

*To all whom it may concern:*

Be it known that I, SALVATORE FASO, a citizen of the United States, residing at Madera, in the county of Madera and State of California, have invented certain new and useful Improvements in Tracks for Tractors; and I do hereby declare the following to be a full, clear, and exact description of the invention, such as will enable others skilled in the art to which it appertains to make and use the same.

My invention relates to improvements in caterpillar tractors and more particularly to the traction means therefor.

An important object of this invention is to provide novel means for connecting the tread shoes of the traction device, whereby wear thereon is reduced to a minimum, without in any way decreasing the efficiency of the tractor.

A further object of this invention is to provide a traction device for tractors which includes a plurality of tread elements connected at their ends by transversely extending channel plates or fastening means, said channel plates or fastening means being adapted to afford additional gripping means for the tractor.

A further object of the invention is to provide a tractor device which is simple, reliable and cheap to manufacture.

Other objects and advantages of this invention will become apparent during the course of the following description.

In the accompanying drawings forming a part of this specification and in which like numerals are employed to designate like parts throughout the same, Figure 1 is a side elevation of a traction device embodying my invention, Fig. 2 is an enlarged detail elevation of several of the tread elements embodied in my invention, showing the connecting means therefor, Fig. 3 is a perspective of one of the tread elements, and Fig. 4 is a perspective of the connecting means for the tread elements.

In the drawings, wherein for the purpose of illustration is shown the preferred embodiment of my invention, the numeral 5 designates a pair of driven wheels of a tractor, (not shown). As it is usual, the wheels 5 are propelled by a motor having connection with axles 6. A caterpillar tread element designated generally by the numeral 7 is disposed about the wheels 5. The traction device includes a plurality of tread elements 8 having wheel engaging lugs 9 on their inner sides for insuring positive engagement of the wheels with the traction device. As clearly illustrated in Fig. 3, the end portions of the tread elements 8 are provided with outwardly extending plates 10. The plates 10 have elongated openings 11 disposed therein. The plates 8 are connected by a plurality of channel plates 12 clearly shown in Fig. 4 of the drawings. The channel plates or connecting devices are segmental in cross section and connect the tread elements 8. As clearly illustrated in Fig. 2, the fastening devices receive the plates 10 of the tread elements. Openings 13 are provided in the sides of the fastening devices 12 and aline with the openings 11 of the plates 10 for the reception of bolts 14. The bolts 14 have nuts 15 arranged thereon for securely retaining the several sections together. Inwardly extending flanges 16 are carried by the outer longitudinal edges of the channel plates 12 and contact with the inner sides of the plates 10. The central portion of the plates 12 are provided with transverse shoulders or abutments 17 extending between the adjacent plates 10 to space the same. Upon encircling the wheels 5 the elongated slots 11 permit of the free movement of the several tread elements thereby causing no strain on the construction. With reference to Fig. 1, it will be apparent that in addition to functioning as fastening elements, the channel plates 12 afford additional surface engaging means for insuring the efficient operation of the tractor.

While I have shown and described the preferred embodiment of my invention, it is understood that I may make such minor changes in arrangement and construction of parts, as will remain within the spirit of the invention and scope of the appended claims.

Having thus described my invention, what I claim is:—

1. A traction device comprising, a plurality of sections, plates carried by the ends of said sections, and transversely extending channel plates carried by said first named plates and engaging the same for connecting said sections and affording additional traction surface to the device.

2. In a traction device, a plurality of tread sections, plates carried by the ends of said tread sections and having elongated openings therein, transversely extending channel plates receiving said first named plates and having openings alining with the openings of said first named plates, fastening means extending through said openings, and means carried by the inner sides of said tread sections for engaging the periphery of a wheel.

3. A traction device comprising, a plurality of tread sections, plates carried by the ends of said tread sections and extending outwardly, channel plates carried by said first named plates, and inwardly extending flanges carried by said channel plates and engaging the inner sides of said first named plates.

4. A traction device comprising, a plurality of tread sections, plates carried by the ends of said tread sections and having elongated openings therein, transversely extending channel plates receiving said first named plates and having openings in their sides alining with the elongated openings of said first named plates, said channel plates being segmental in cross section, fastening means extending through the openings of said first and second named plates, and inwardly directed flanges carried by the longitudinal edges of said channel plates and engaging the inner sides of said first named plates.

5. In a tractor, a plurality of tread sections, laterally projecting plates carried by the ends of said traction sections, and having elongated openings therein, transversely extending fastening devices arranged on opposite sides of said plates and being segmental in cross section, inwardly extending flanges carried by said fastening devices and disposed on the inner sides of said plates, said fastening devices having openings alining with the openings of said plates, bolts extending through said alining openings and transversely extending lugs carried by the inner sides of said tread elements.

6. A traction device comprising, a plurality of tread sections, plates carried by the ends of said tread sections and extending outwardly, channel plates carried by said plates, inwardly extending flanges carried by said channel plates and adapted to engage the inner side of said first named plates, and transverse shoulders carried by said channel plates and adapted to space said plates.

In testimony whereof I affix my signature in presence of two witnesses.

SALVATORE FASO.

Witnesses:
SEBASTIONO FASO,
VINCENT FASO.